(12) United States Patent
Haeffner

(10) Patent No.: US 9,141,311 B2
(45) Date of Patent: Sep. 22, 2015

(54) MULTI-USE ADAPTERS, SOLID STATE STORAGE MODULES AND HIGH CAPACITY STORAGE SYSTEMS

(71) Applicant: Christopher T. Haeffner, McHenry, IL (US)

(72) Inventor: Christopher T. Haeffner, McHenry, IL (US)

(73) Assignee: New Concepts Development Corp., Woodstock, IL (US)

( * ) Notice: Subject to any disclaimer, the term of this patent is extended or adjusted under 35 U.S.C. 154(b) by 0 days.

(21) Appl. No.: 13/969,855

(22) Filed: Aug. 19, 2013

(65) Prior Publication Data

US 2014/0075065 A1    Mar. 13, 2014

Related U.S. Application Data

(60) Provisional application No. 61/684,366, filed on Aug. 17, 2012.

(51) Int. Cl.
| | |
|---|---|
| *G06F 13/12* | (2006.01) |
| *G06F 13/38* | (2006.01) |
| *G06F 3/06* | (2006.01) |

(52) U.S. Cl.
CPC .............. *G06F 3/0689* (2013.01); *G06F 3/061* (2013.01); *G06F 3/0607* (2013.01); *G06F 3/0655* (2013.01); *G06F 3/0658* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 6,845,409 | B1 * | 1/2005 | Talagala et al. | 710/20 |
| 8,180,931 | B2 * | 5/2012 | Lee et al. | 710/14 |
| 2012/0033947 | A1 * | 2/2012 | Benbrahim | 386/252 |
| 2012/0215950 | A1 * | 8/2012 | Anderson | 710/33 |
| 2013/0145071 | A1 * | 6/2013 | Chu et al. | 710/313 |
| 2013/0268697 | A1 * | 10/2013 | Lambert et al. | 710/11 |

* cited by examiner

*Primary Examiner* — Elias Mamo
(74) *Attorney, Agent, or Firm* — Scherrer Patent & Trademark Law, P.C.; Stephen T. Scherrer; Monique A. Morneault

(57) ABSTRACT

The present invention relates to multi-use adapters, specifically for adding functionality to a computing system via a Thunderbolt™ connector or other high speed connector. In addition, the present invention relates to RAID storage modules built upon the multi-use adapters of the present invention. Further, RAID storage systems consisting of multiple RAID storage modules are provided. Methods of making and using the same are further provided.

19 Claims, 15 Drawing Sheets

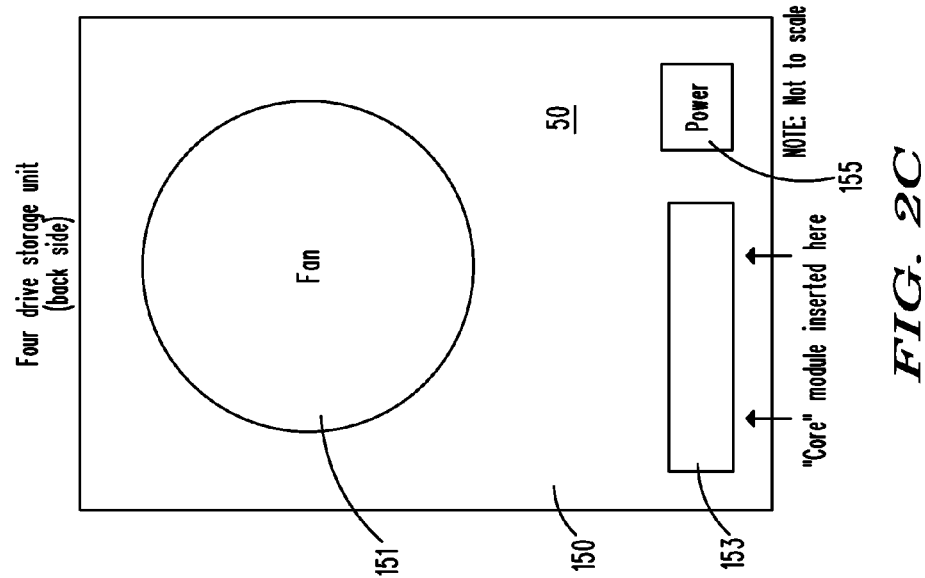
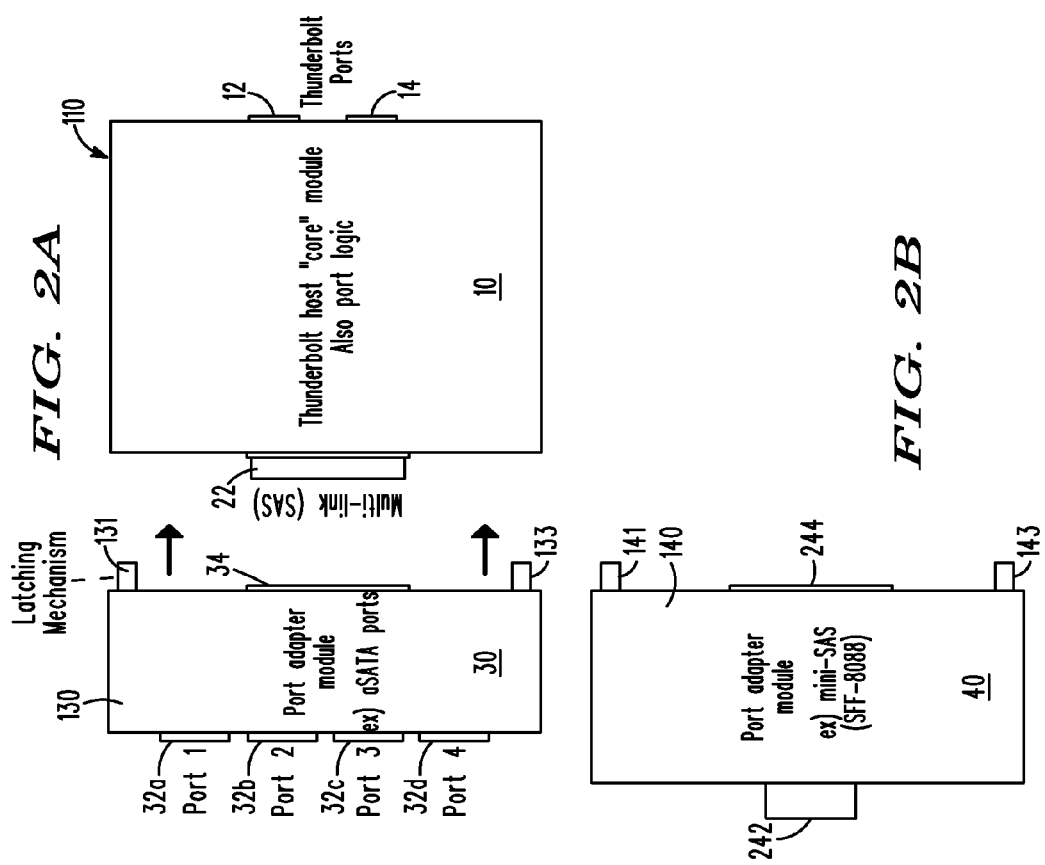

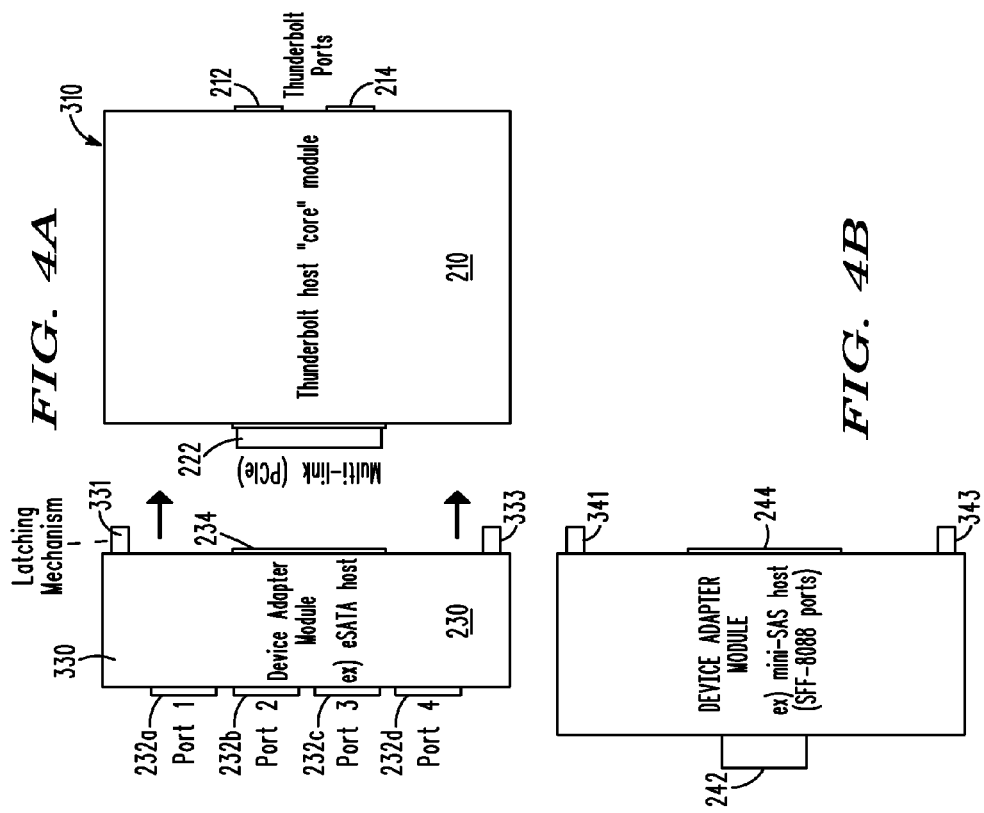

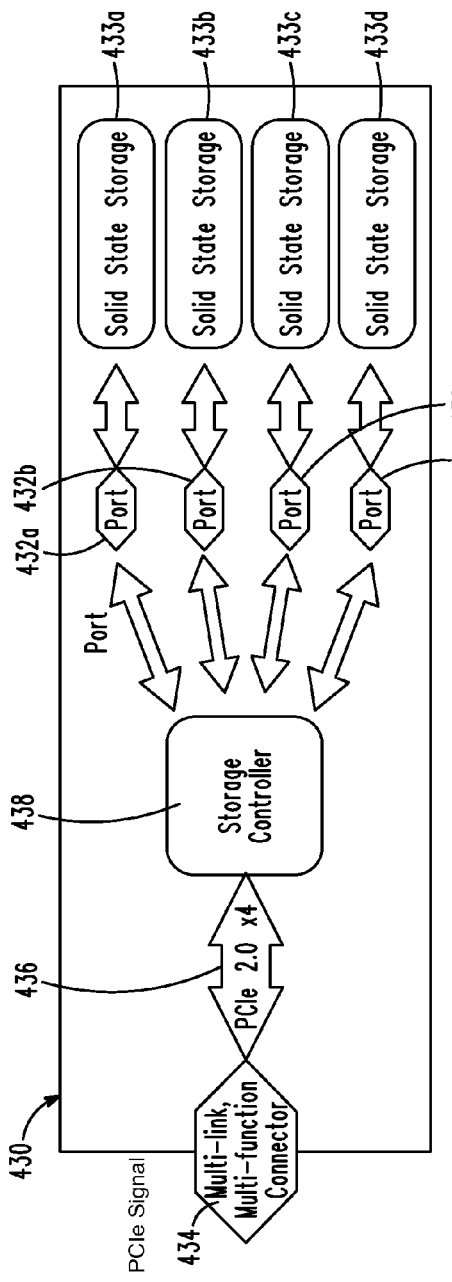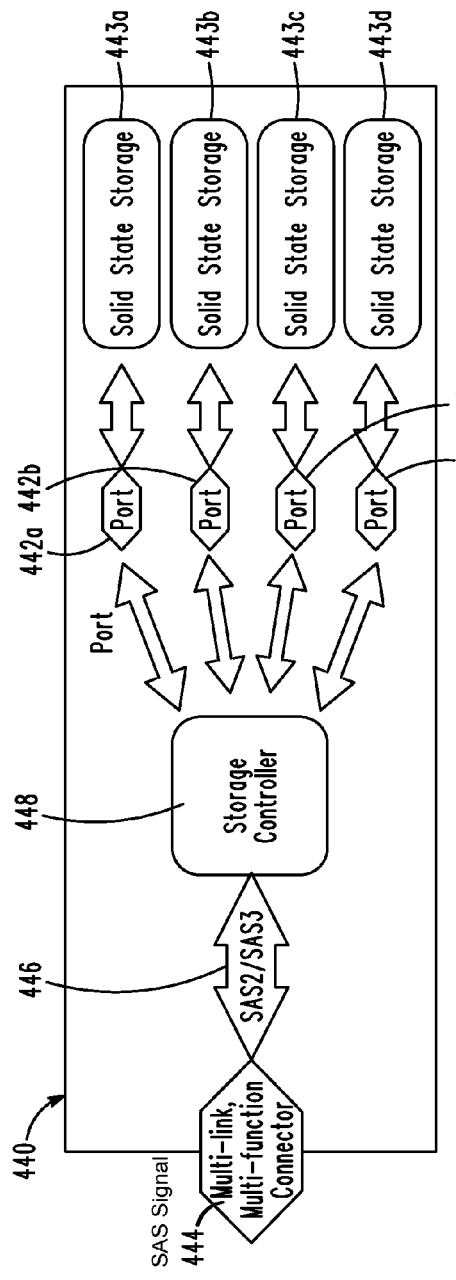

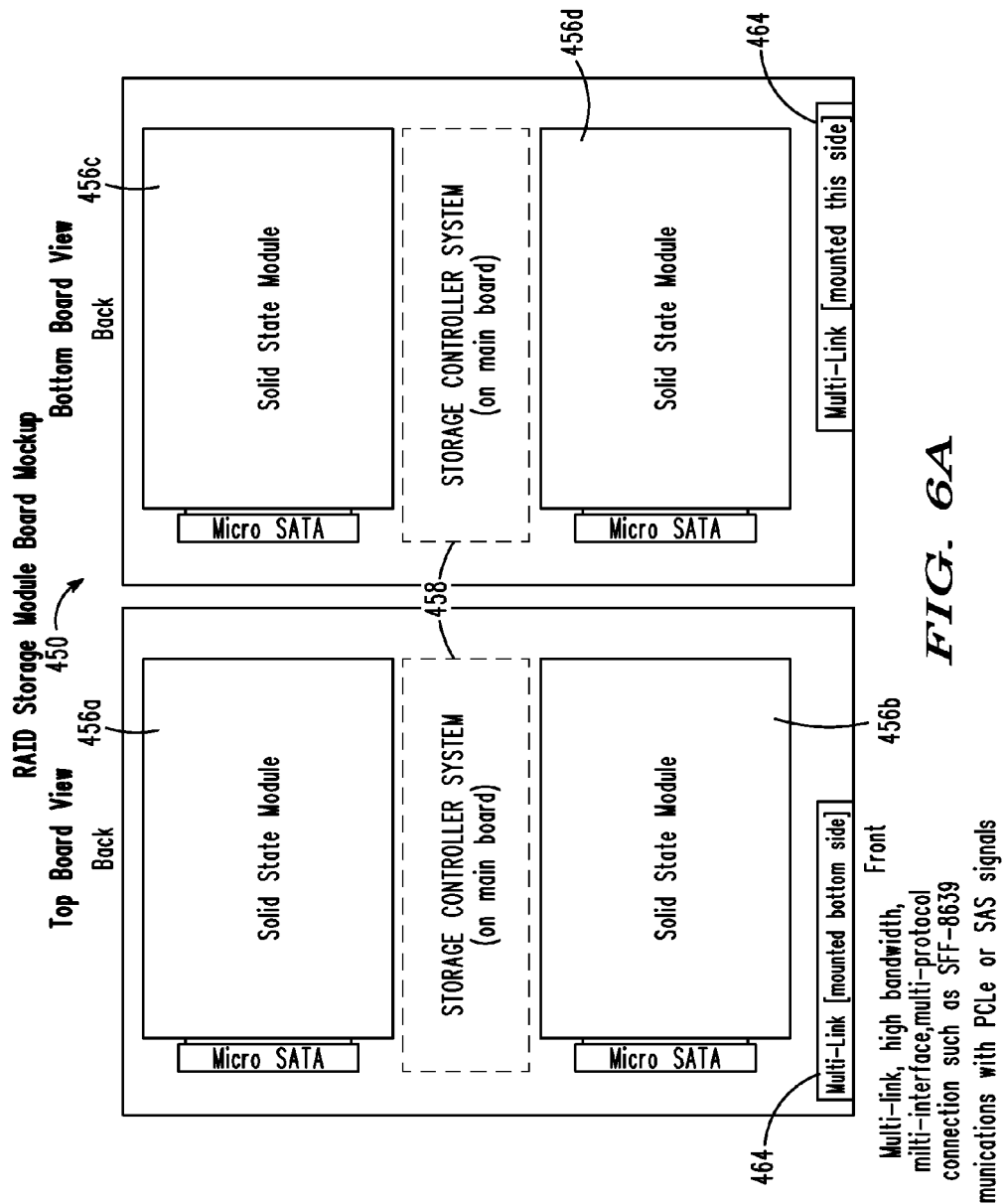

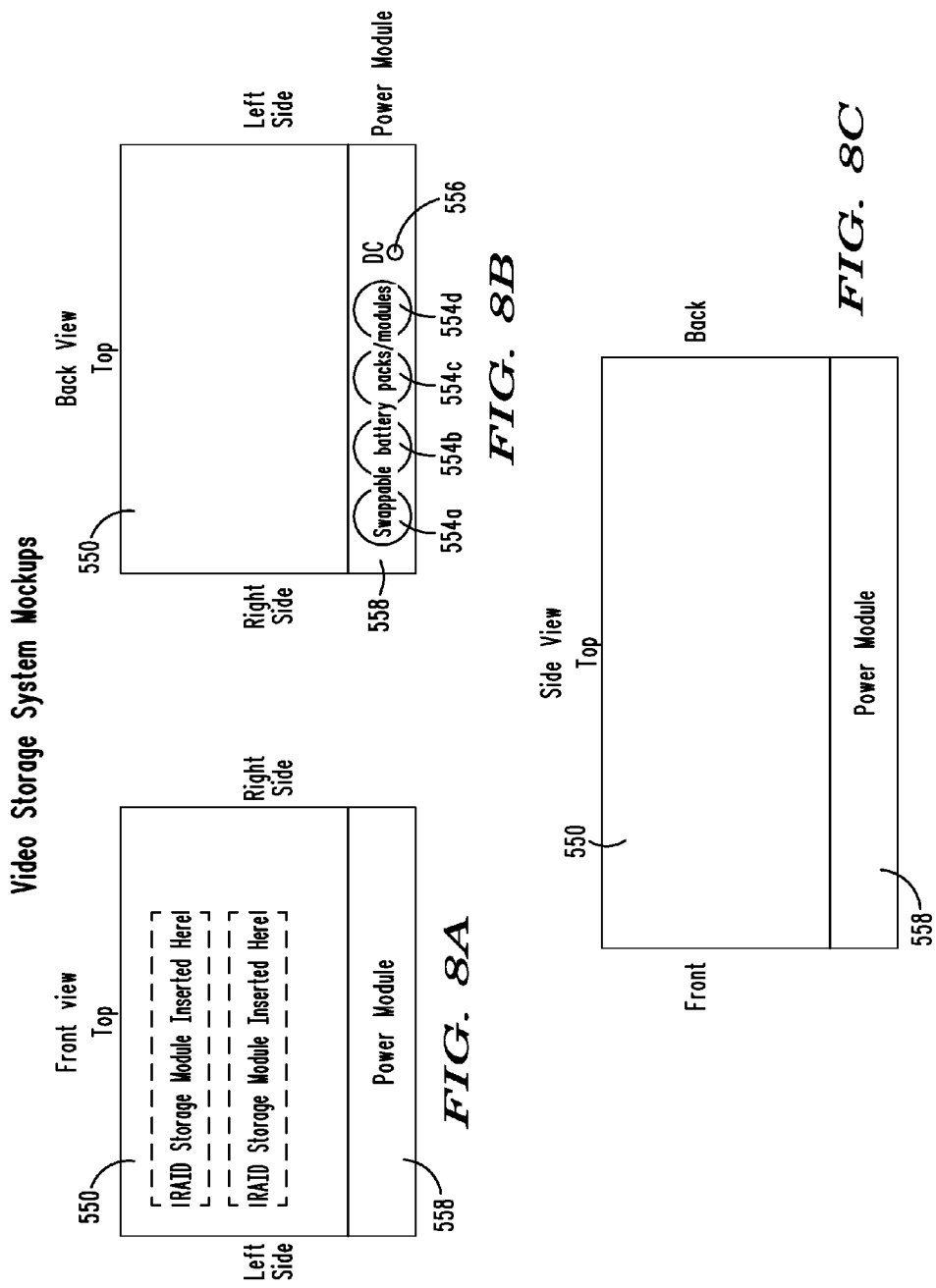

US 9,141,311 B2

MULTI-USE ADAPTERS, SOLID STATE STORAGE MODULES AND HIGH CAPACITY STORAGE SYSTEMS

The present invention claims priority to U.S. Provisional Pat. App. No. 61/684,366, entitled, "Multi-Use Adapters, Solid State Storage Modules and High Capacity Storage Systems," filed Aug. 17, 2012, which is incorporated herein by reference in its entirety.

TECHNICAL FIELD

The present invention relates to multi-use adapters, specifically for adding functionality to a computing system via a Thunderbolt™ connector or other high speed connector. In addition, the present invention relates to RAID storage modules built upon the multi-use adapters of the present invention. Further, RAID storage systems consisting of multiple RAID storage modules are provided. Methods of making and using the same are further provided.

BACKGROUND

It is, of course, generally known to provide adapters for increasing connectivity and/or functionality of computing devices. Typical computer I/O currently utilized include USB cables and connectors as well as Firewire cables and connectors for connecting peripherals to a computing device. Thunderbolt™ has recently been developed by Intel® and is starting to be used in most Apple® computers for connecting to high-speed peripherals and high resolution displays. Indeed, Thunderbolt™ is touted by Apple Computers as the next generation connectivity, allowing the freedom of USB with the robustness of PCI Express technology, which is typically used to connect all high performance components in an Apple Mac computer.

Thunderbolt™ is particularly useful because it provides two channels of connectivity, with up to 10 Gbps data transfer through each channel. Thus, the Thunderbolt™ connector is rated as twenty times faster than typical USB 2.0 and twelve times faster than Firewire. Therefore, it is generally known that one may daisy chain together multiple high performance peripherals through a single Thunderbolt™ port, while maintaining maximum throughput and without sacrificing quality.

However, while Thunderbolt™ offers superior connectivity and data transfer ability, there are still many devices that do not have Thunderbolt™ connectivity and must typically rely on older technology, such as devices that utilize SAS/SATA connectivity, including eSATA connectivity and mini-SAS connectivity. Many peripheral devices utilize SAS/SATA connectivity and are, generally, heretofore not able to easily and efficiently connect to a computing device via Thunderbolt™ connectivity. A need, therefore, exists for a multi-use adapter module for adapting peripheral devices having SAS/SATA connectivity, or other connectivity, through Thunderbolt™ connectivity.

Moreover, because Thunderbolt™ allows a large amount of data streaming through its two channels, many peripheral devices may be connected through Thunderbolt™ ports without sacrificing performance and without limiting data transfer. However, because of the difficulty in connecting non-Thunderbolt™ devices to Thunderbolt™ ports, it is difficult to take advantage of the large data transfer capacity through Thunderbolt™ ports. Therefore, a need exists for a multi-use adapter for adapting several peripheral devices having SAS/SATA, or other connectivity, through Thunderbolt™ ports to take advantage of Thunderbolt™ data transfer abilities.

Computing devices typically have hard drive storage capabilities, utilizing, generally, standard 3.5 inch hard drive enclosures. These hard drives have serious limitations, in that each typically utilizes a spinning disk for reading and writing data thereon. Because the storage process is largely mechanical, there may be a large incidence of mechanical problems leading to errors that may be introduced into data. If the mechanical failure is sufficiently extreme, the drive may simply cease to function, and an individual may lose the ability to read and/or write data to the disk.

Recently, solid state drives have begun to replace so-called standard hard disks. Solid state drives provide superior data transfer, while not utilizing mechanical means for reading from and writing to the drive. Therefore, solid state drives are less susceptible to mechanical malfunction. However, typical computers are not equipped to easily house solid state drives, as special controllers and connectivity are typically required. A need, therefore, exists for a storage module containing one or more solid state drives that may be utilized through existing typical hard disk hard drive technology.

In addition, RAID storage modules are generally known to provide a storage solution for computing devices having vast amounts of storage capability. RAID, standing for "redundant array of independent disks" or "redundant array of inexpensive disks" is a storage technology that combines multiple disk drive components into a logical unit. Data is distributed across the drives in one of several ways called "RAID levels", depending on what level of redundancy and performance (via parallel communication) is required. Generally, RAID is now used as an umbrella term for computer data storage schemes that can divide and replicate data among multiple physical drives. The physical drives are said to be in a RAID array, which is accessed by the operating system as one single drive.

However, as solid state drives come into the fore as the preferred hard drive technology, it is useful to be able to capitalize on the superior quality of solid state storage in a RAID array, much like traditional disks have been able to. However, there is no easy mechanism for incorporating solid state drives into typical RAID arrays, as typical RAID arrays are generally designed to accept the traditional 3.5 inch hard drive. A need, therefore, exists for utilizing RAID array technology for solid state drive technology, incorporating the solid state drive technology into traditional 3.5 inch drive encasements.

SUMMARY OF THE INVENTION

The present invention relates to multi-use adapters, specifically for adding functionality to a computing system via a Thunderbolt™ connector or other high speed connector. In addition, the present invention relates to RAID storage modules built upon the multi-use adapters of the present invention. Further, RAID storage systems consisting of multiple RAID storage modules are provided. Methods of making and using the same are further provided.

To this end, in an embodiment of the present invention, a multi-use adapter module is provided. The adapter module comprises a first portion comprising a core module, the core module having thunderbolt connectivity on a first end and a multi-link, multi-function connector on a second end thereof, and a second port adapter module comprising a multi-link, multi-function connector on a first end thereof and at least one port on a second end thereof for connecting at least one peripheral device thereto.

In an embodiment of the present invention, a RAID storage module is provided. The RAID storage module comprises, in a traditional 3.5 inch hard drive case, at least one solid state storage drive connected via a port to a storage controller, in turn connected to a multi-link, multi-function connector for connecting to a core module of the present invention.

In an alternate embodiment of the present invention, a RAID storage system is provided. The RAID storage system comprising a RAID enclosure comprising a RAID storage controller and a power input, the RAID enclosure comprising a plurality of RAID storage module connectors, and further comprising at least one RAID storage module comprising at least one solid state storage drive.

It is, therefore, an advantage and objective of the present invention to provide a multi-use adapter module for adapting peripheral devices having SAS/SATA connectivity, or other connectivity, through Thunderbolt™ connectivity.

In addition, it is an advantage and objective of the present invention to provide a multi-use adapter for adapting several peripheral devices having SAS/SATA, or other connectivity, through Thunderbolt™ ports to take advantage of Thunderbolt™ data transfer abilities.

Further, it is an advantage and objective of the present invention to provide a storage module containing one or more solid state drives that may be utilized through existing typical hard disk hard drive technology.

Still further, it is an advantage and objective of the present invention to provide RAID array technology for solid state drive technology, incorporating the solid state drive technology into traditional 3.5 inch drive encasements.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 2A-2C illustrate multi-use Thunderbolt™ adapter module apparatuses in embodiments of the present invention.

FIGS. 4A-4C illustrate multi-use Thunderbolt™ adapter module apparatuses in alternate embodiments of the present invention.

FIGS. 5A-5B illustrates RAID storage modules in further alternate embodiments of the present invention.

FIGS. 6A-6F illustrate RAID storage module apparatuses in the alternate embodiments of the present invention.

FIGS. 8A-8C illustrate a RAID storage system apparatus in the still further alternate embodiment of the present invention.

DETAILED DESCRIPTION OF THE PRESENTLY PREFERRED EMBODIMENTS

The present invention relates to multi-use adapters, specifically for adding functionality to a computing system via a Thunderbolt™ connector or other high speed connector. In addition, the present invention relates to RAID storage modules built upon the multi-use adapters of the present invention. Further, RAID storage systems consisting of multiple RAID storage modules are provided. Methods of making and using the same are further provided.

In a first embodiment of the present invention, a multi-use adapter module is provided. The multi-use adapter module comprises a core module and a port adapter or device adapter module, wherein the core module and port adapter or device adapter module are connected to each other through a multi-link, multi-function controller. The port adapter module provides a plurality of ports for connecting devices thereto, such as, for example, having SATA or SAS connectivity, including, but not limited to eSATA and mini-SAS.

Figure 1A:
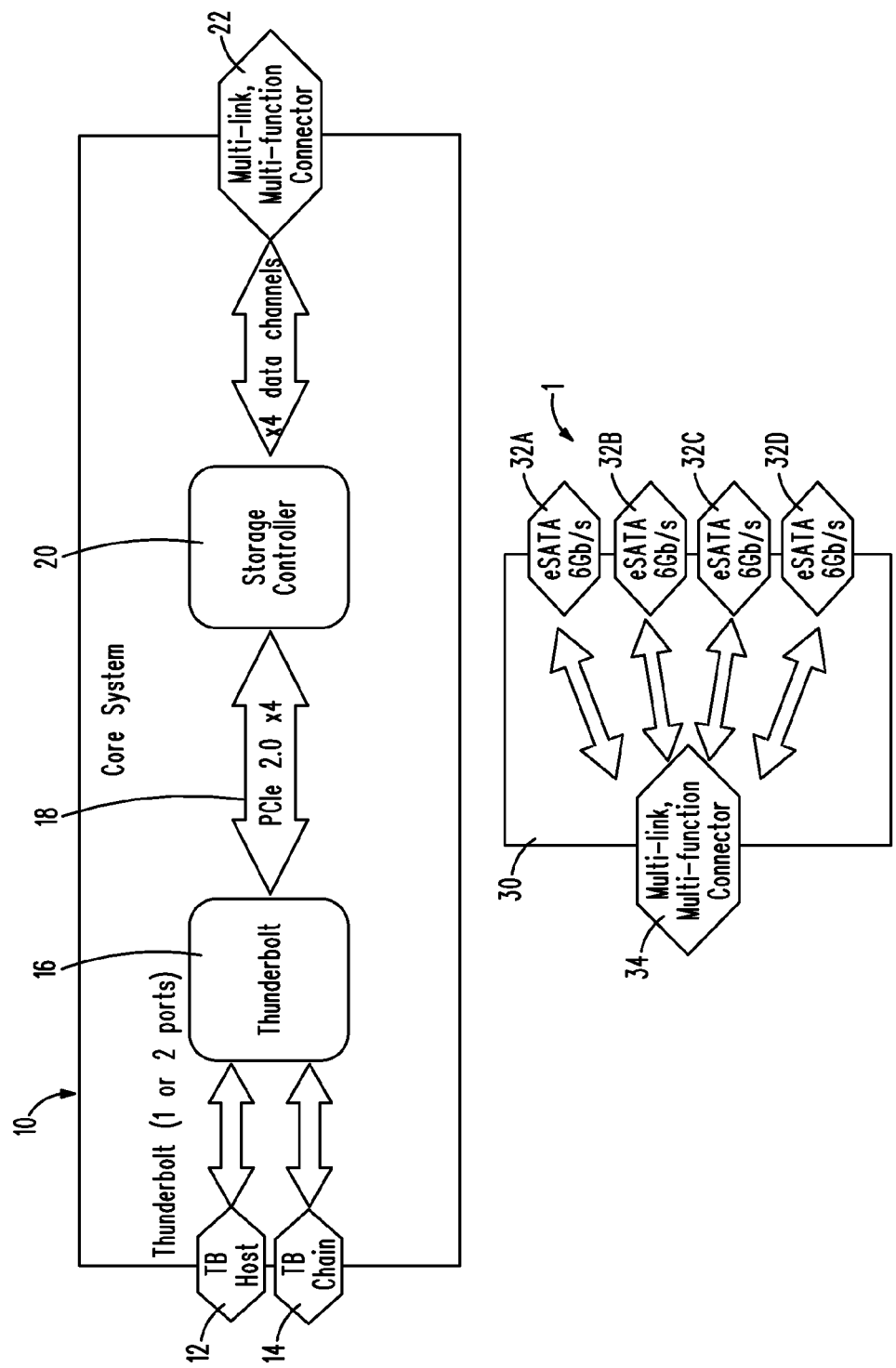
FIGS. 1A-1C illustrate block diagrams of embodiments of multi-use Thunderbolt™ adapters.
Figure 1B:
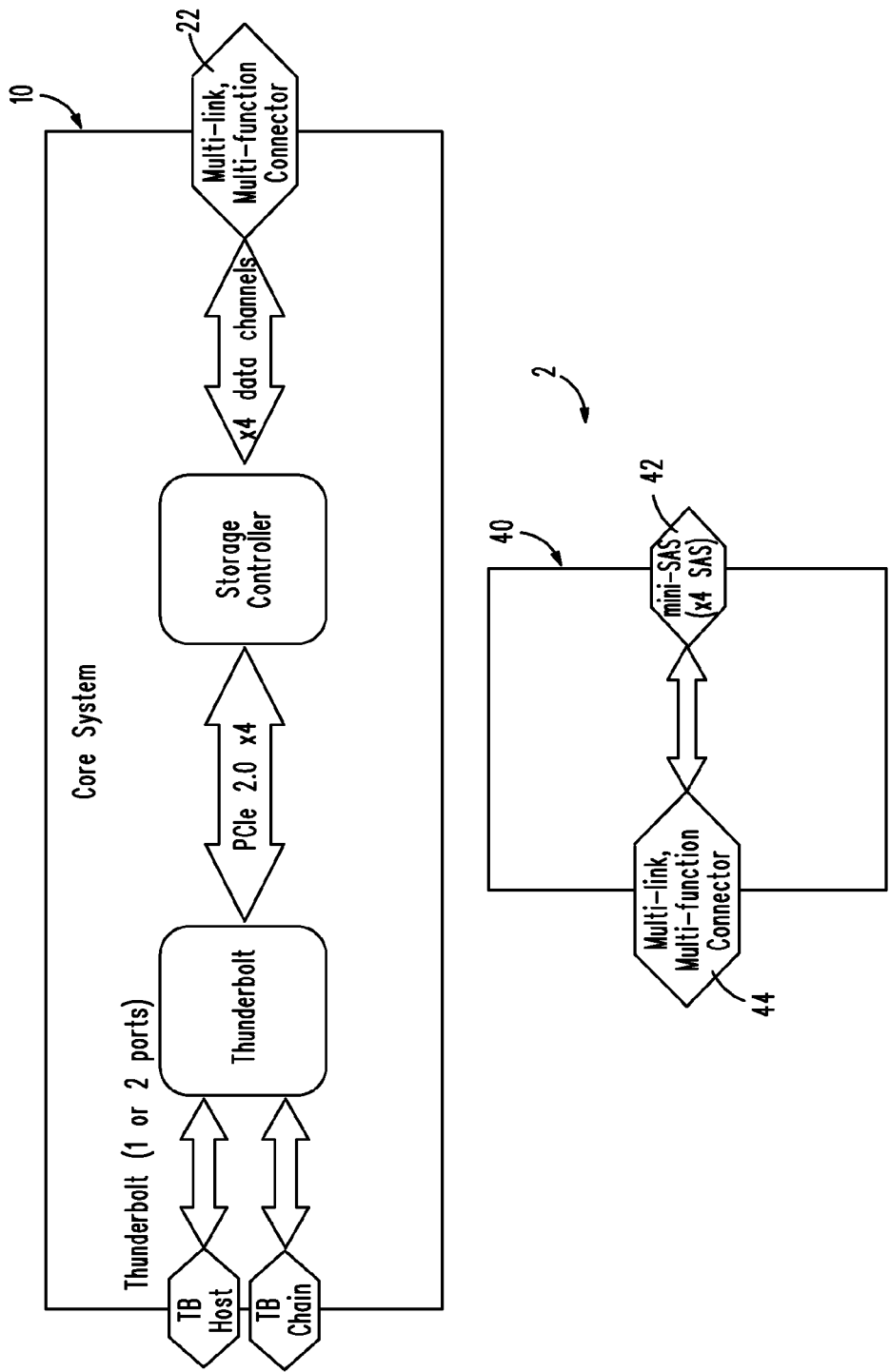
Figure 1C:
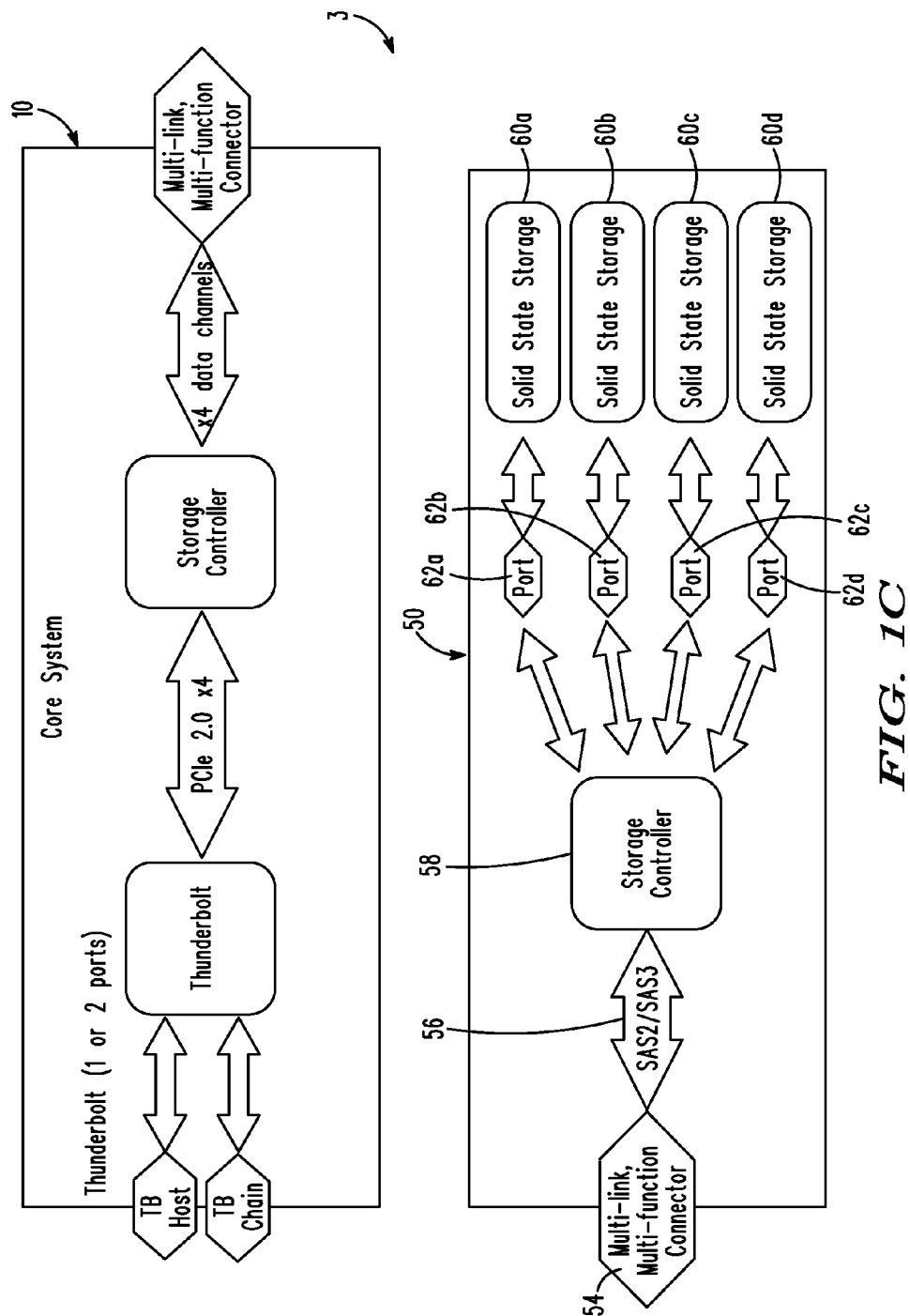

Now referring to the figures, wherein like numerals refer to like parts, FIGS. 1A-1C illustrate a first system and method of the present invention. Specifically, FIG. 1A illustrates a multi-use adapter module 1 having a core module 10 comprising Thunderbolt™ ports 12, 14 on a first end thereof and a Thunderbolt™ driver module 16 connected through a high-speed connection 18, such as PCI Express or other high speed connection. The high speed connection 18 may have a plurality of sub-connections for integrating a plurality of ports and/or devices, as described below. Specifically, FIG. 1A illustrates that the PCI Express connection has four sub-connections for integrating up to four ports and/or four devices.

Within the core module 10 may be a storage controller 20 for controlling the data from a plurality of data channels through the core system, which may be connected to the Thunderbolt™ driver 16 via the PCI Express connections 18. Although FIG. 1A illustrates four data channels, it should be noted that any number of data channels may be provided and the invention should not be limited as described herein. The four data channels may be connected to the storage controller 20 via a first multi-link, multi-function connector 22 disposed on a second end of the core module 10. The first multi-link, multi-function connector 22 may be any high-speed data transfer connector, including, for example, SAS, SATA or PCI Express. Although the present invention describes the controller 20 as a "storage controller", it should be noted that other controllers may be provided for controlling other peripherals, such as a card reader controller or other controller, and the present invention should not be limited as described herein.

The multi-use adapter apparatus 1 may further have a port adapter module 30 having a plurality of ports 32a, 32b, 32c, 32d therein for connecting to a plurality of peripheral devices (not shown). The port adapter module 30 may connect to a second multi-use, multi-function connector 34 on an end of the port adapter module 30. Thus, the plurality of ports 32a-32d may be interconnected to the core module 10, providing the plurality of ports 32a-32d with Thunderbolt™ connection capability, allowing the adapter 1 to be utilized with a computing device having Thunderbolt™ connectivity.

The plurality of ports 32a-32d may have traditional connectivity. For example, as illustrated in FIG. 1A, the plurality of ports 32a-32d may be eSATA ports having 6 Gb/s data transfer capability. Because the plurality of ports is connected into a Thunderbolt™ adapter core module 10, the Thunderbolt™ should have no problem handing the data transfer capability through the plurality of ports 32a-32d.

FIG. 1B illustrates an alternate embodiment of the present invention of a multi-use adapter 2 having the core module 10, as described above, and an alternate port adapter module 40. The alternate port adapter module 40 may have at least one mini-SAS connector 42 on an end thereof for connecting at least one peripheral device having mini-SAS connectivity. The at least one mini-SAS connector may be routed to a multi-link, multi-function connector 44 on an end thereof, for connecting to the core module 10, as described above. Moreover, a plurality of mini-SAS ports may be provided, such as, for example, up to four. Thus, the present invention allows peripheral devices having mini-SAS connectivity to be connected via Thunderbolt™ connectivity, according to the present invention.

In addition, it should be noted that since the core module 10 remains the same, the port adapter module may be swapped in and out depending on the connectivity needed. Therefore, a user of the same may not be required to replace the entirety of the system for providing alternative connectivity, as only the port adapter modules 30, 40, or other port adapter modules, may be swapped.

FIG. 1C illustrates an alternate embodiment of the present invention of a multi-use adapter 3 having the core module 10, as described above, and a device adapter module 50, connecting to the core module 10 via a multi-link, multi-function connector 54. However, within the device adapter module 50 may be a storage controller 58 that is connected to the multi-link, multi-function connector 54 via, for example, SAS connectivity 56, although any other connectivity may be provided, such as via PCI Express or the like. The storage controller 58 may control the data transfer to and from a plurality of peripheral devices, namely, a plurality of solid state storage drives 60a, 60b, 60c, 60d, which may be connected to the storage controller 58 via ports 62a, 62b, 62c, 62d, respectively. Thus, the solid state storage drives 60a-60d may be connected to a computing device (not shown) through the core module 10, and ultimately through a Thunderbolt™ connection to a computing device. The device adapter module 50 may be implemented as shown in exemplary embodiments described below with referenced to FIGS. 5A-5B and 6A-6F.

FIGS. 2A-2C illustrate examples of apparatuses of the present invention, including apparatuses housing the core module 10 and the various port adapter modules 30, 40 and the device adapter module 50, as described above. Specifically, the core module 10 may be illustrated as core module apparatus 110 in FIG. 2A, including Thunderbolt™ ports 12, 14 and the multi-link, multi-function connector 22, which may connect to the port adapter module 30, illustrated as port adapter module apparatus 130 in FIG. 2A. The port adapter module apparatus 130 may have the plurality of ports 32a, 32b, 32c, 32d, as well as the multi-link, multi-function connector 34. The multi-link, multi-function connector 34, represented as a SAS high speed connector in FIGS. 1A, 1B, may interconnect with the multi-link, multi-function connector 22 (also SAS connectors), allowing the ports 32a-32d to be routed into the computing device (not shown) via Thunderbolt™ connectivity. To hold the port adapter module apparatus 130 to the core module apparatus 110, latching mechanisms 131, 133 may be provided for interconnecting the same, such as via screws, magnets or other like latching mechanisms.

FIG. 2B illustrates an example of an apparatus for providing mini-SAS connectivity as the port adapter module 40. Specifically, port adapter module apparatus 140 may have the mini-SAS connector 42, as illustrated above in FIG. 1B on one end thereof and the multi-link, multi-function connector 44 on the other end thereof for connecting the port adapter module apparatus 140 to the core module apparatus 110 via the multi-link, multi-function connectors 44, 22. The latching mechanisms 141, 143 may further be provided for latching the apparatuses together.

FIG. 2C illustrates an example of an apparatus providing the four solid state storage drive device adapter module 50, as described above with reference to FIG. 1C. Specifically, device adapter module apparatus 150, containing the four solid state drives of device adapter module 50, may have a connector 153, which may be the same as the multi-link, multi-function connector 54, described above with reference to FIG. 1C, for accepting the core module apparatus 110 to connect the same. A fan 151 may further be provided for cooling the same and ensuring that the solid state drives contained therein do not overheat. Device adapter module apparatus 150 may further have a power button 155 for turning the same off or on.

Referring now to FIGS. 3A-3D, alternate embodiments of multi-use adapter modules in accordance with the present invention are provided. Specifically, the multi-use adapter modules of FIGS. 3A-3D comprise a core module and a port adapter or device adapter module, wherein the core module and port adapter or device adapter module are connected to each other through a multi-link, multi-function controller. The port adapter module provides a plurality of ports for connecting devices thereto, such as, for example, having SATA or SAS connectivity, including, but not limited to eSATA and mini-SAS. Moreover, the port adapter module includes Storage Controllers therein (as opposed to within the core modules as shown in FIGS. 1A-1C) or other peripheral device drivers, such as card readers or other components, such as switches or the like.

Specifically, FIGS. 3A-3D illustrate multi-use adapters 201, 202, 203 and 204, respectively, each including a core module 210 providing a connection for port adapter modules or device adapter modules, as described below. The core modules 210 include Thunderbolt™ ports 212, 214 connected to a Thunderbolt™ driver 216, interconnected to a multi-link, multi-function connector 222 via PCI Express connectors 218, which may have four sub-connectors therein, as described above with reference to FIG. 1A. The core module 210 may be connected to a port adapter module 230 comprising a multi-link, multi-function connector 234, which may be connected to a storage controller 238 via PCI Express connectors 236, which have may four sub-connectors, to allow connectivity with up to four ports 232a, 232b, 232c, 232d. The ports may be SAS/SATA connectors, and may provide connectivity with additional peripheral devices, which may then be connected to the computing device (not shown) through the core module 210 via the Thunderbolt™ ports. 212, 214.

Figure 3A:
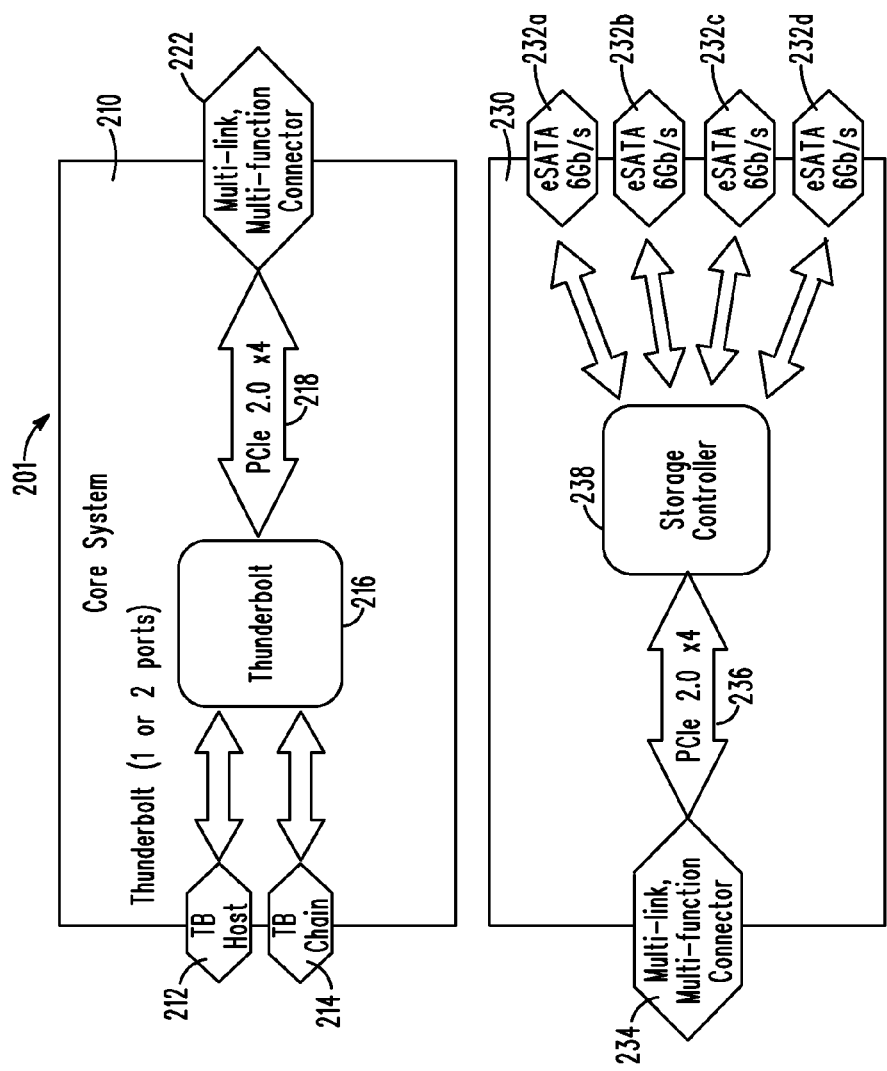
FIGS. 3A-3D illustrate multi-use Thunderbolt™ adapter modules in alternate embodiments of the present invention.
Figure 3B:
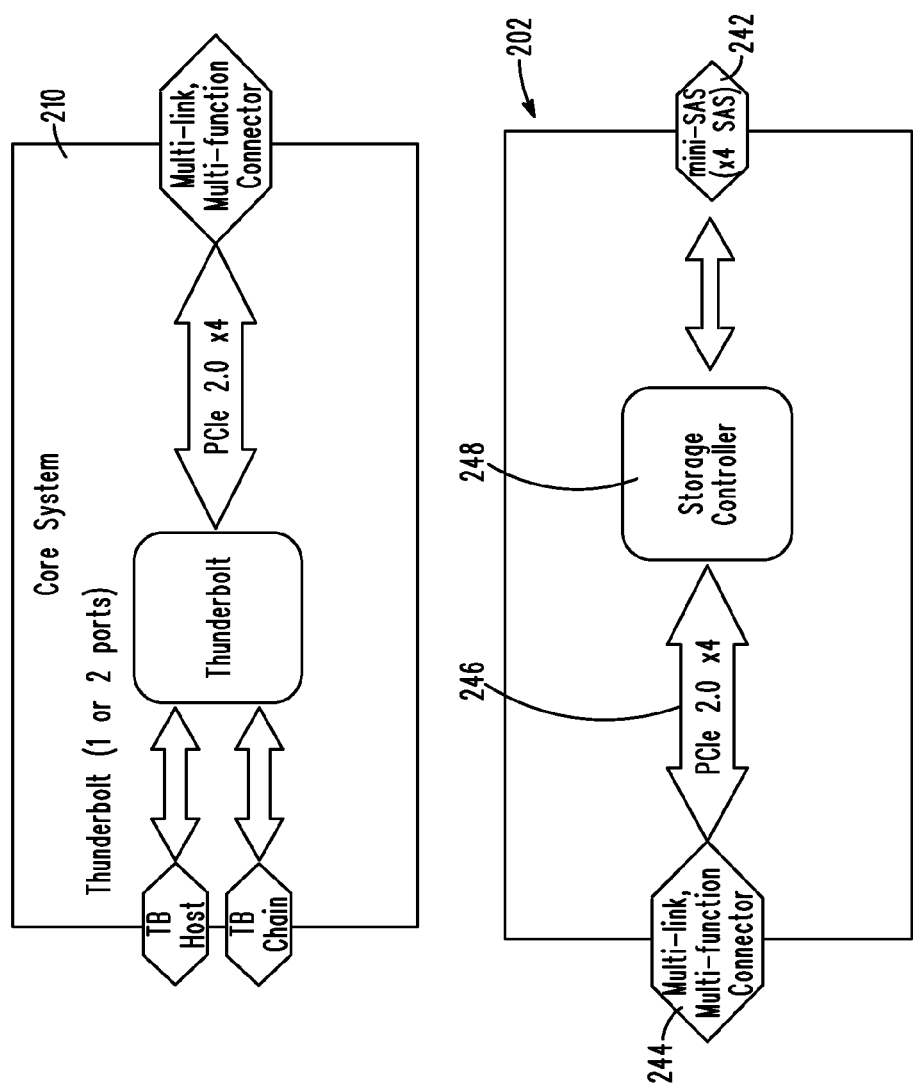

FIG. 3B illustrates an alternate embodiment of a multi-use adapter system 202, including the core module 210 connected to a port adapter module 240, comprising a multi-link, multi-function connector 244, connected to a storage controller 248 via PCI Express connectors 246, which may in turn be connected to one or more mini-SAS connectors 242, allowing mini-SAS connective peripheral devices to be connected to a computing device (not shown) via the Thunderbolt™ ports of the core module 210.

Figure 3C:
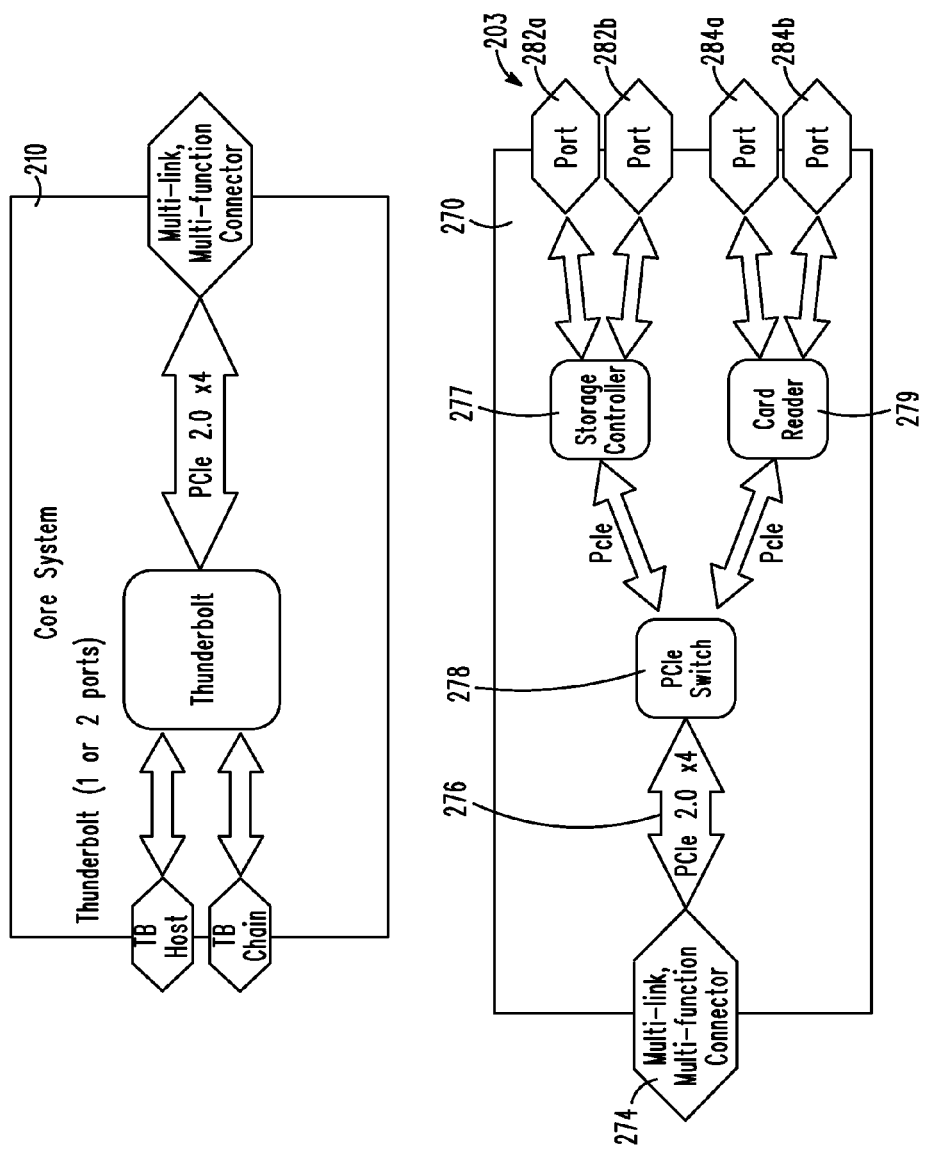

FIG. 3C illustrates a further alternate embodiment of the present invention of a multi-use adapter system 203, including the core module 210 connected to a port adapter module 270, comprising a multi-link, multi-function connector 274, connected via PCI Express connectors 276 to a PCI Express switch 278, which may be connected via PCI Express connection to either a storage controller 277 or a card reader controller 279. The storage controller 277 may be connected to ports 282a, 282b to provide storage controller functionality to the same. The card reader controller 279 may be connected to ports 284a, 284b to provide card reading functionality to the same.

Figure 3D:
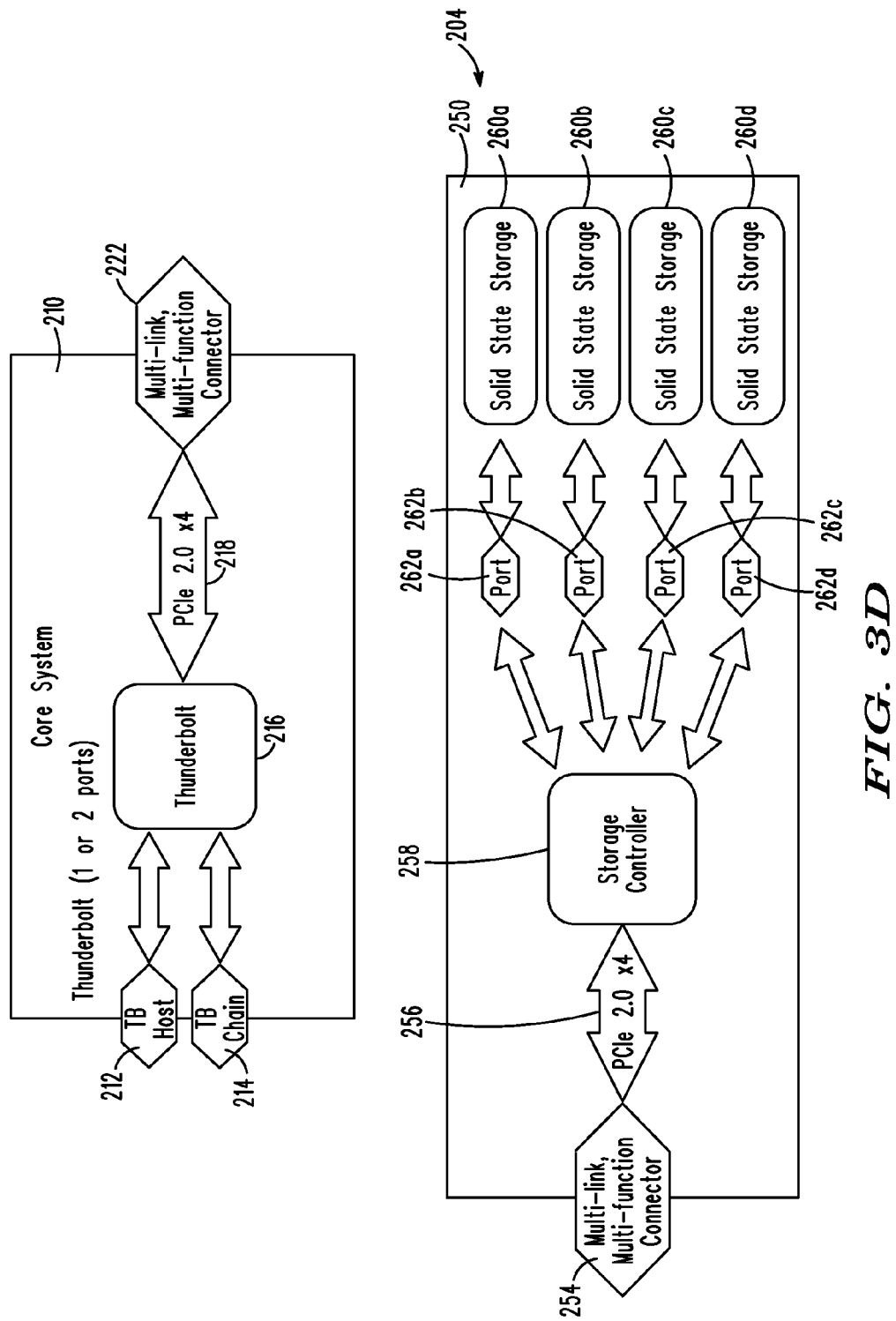
Figure 6E:
Figure 6F:
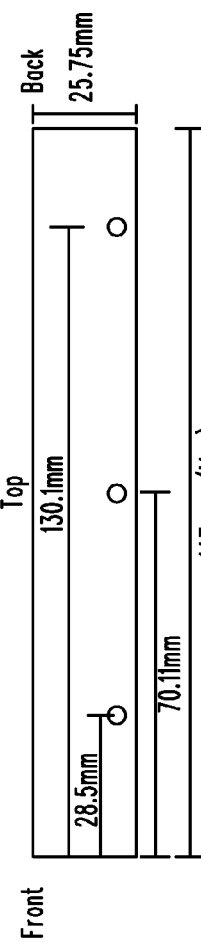
Figure 6B:
Figure 6C:
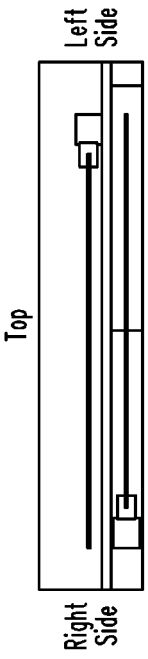
Figure 6D:
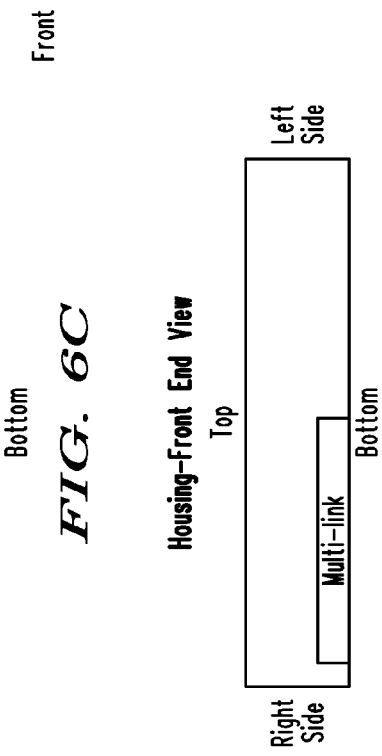

FIG. 3D illustrates a still further alternate embodiment of the present invention of a multi-use adapter system 204, including the core module 210 connected to a device adapter module 250, comprising a multi-link, multi-function connector 254 connected via PCI Express connectors 256 to storage controller 258. The storage controller 258 is connected to a plurality of ports 262a, 262b, 262c, 262d connected, respectively, to solid state storage drives 260a, 260b, 260c, 260d. Thus, the device adapter module 250 may incorporate therein a plurality of solid state drives which may be connected to a computing device (not shown) via the Thunderbolt™ ports of the core module 210.

FIGS. 4A-4C illustrate examples of apparatuses of the present invention described above with reference to FIGS. 3A-3D, including apparatuses housing the core module 210 and the various port adapter modules 230, 240 and the device adapter module 250, as described above. Specifically, the core module 210 may be illustrated as core module apparatus 310 in FIG. 4A, including Thunderbolt™ ports 212, 214 and the multi-link, multi-function connector 222, which may connect to the port adapter module 230, illustrated as port adapter module apparatus 330 in FIG. 4A. The port adapter module apparatus 330 may have the plurality of ports 232a, 232b, 232c, 232d, as well as the multi-link, multi-function connector 234. The multi-link, multi-function connector 234, represented as a PCI Express high speed connectors, may interconnect with the multi-link, multi-function connector 222 (also PCI Express connectors), allowing the ports 232a-232d to be routed into the computing device (not shown) via Thunderbolt™ connectivity. To hold the port adapter module apparatus 330 to the core module apparatus 310, latching mechanisms 331, 333 may be provided for interconnecting the same, such as via screws, magnets or other like latching mechanisms.

FIG. 4B illustrates an example of an apparatus for providing mini-SAS connectivity as the port adapter module 240. Specifically, port adapter module apparatus 340 may have the mini-SAS connector 242, as illustrated above in FIG. 3B on one end thereof and the multi-link, multi-function connector 244 on the other end thereof for connecting the port adapter module apparatus 340 to the core module apparatus 310 via the multi-link, multi-function connectors 244, 222. The latching mechanisms 341, 343 may further be provided for latching the apparatuses together.

FIG. 4C illustrates an example of an apparatus providing the four solid state storage drive device adapter module 50, as described above with reference to FIG. 3D. Specifically, device adapter module apparatus 350, containing the four solid state drives of device adapter module 250, may have a connector 353, which may be the same as the multi-link, multi-function connector 254, described above with reference to FIG. 3D, for accepting the core module apparatus 310 to connect the same. A fan 351 may further be provided for cooling the same and ensuring that the solid state drives contained therein do not overheat. Device adapter module apparatus 350 may further have a power button 355 for turning the same off or on.

Now referring to FIGS. 5A, 5B, RAID storage modules 430, 430 are illustrated. Specifically, FIG. 5A illustrates RAID storage module 430 may include a multi-link, multi-function connector 434, represented as a PCI Express connector for receiving a PCIe signal. Connected to the connector 434 may be PCI Express connectors connected to storage controller 438, which may be connected to four ports 432a, 432b, 432c, 432d, in turn connected to four solid state drives 433a, 433b, 433c, 433d. Thus, the four solid state drives may be connected to the computing device (not shown) via the PCI Express connectivity and, ultimately, via the Thunderbolt™ connectivity of the core module (not shown).

Moreover, FIG. 5B illustrates RAID storage module 440 may include a multi-link, multi-function connector 444, represented as a SAS connector for receiving a SAS signal. Connected to the connector 444 may be SAS2/SAS3 connectors connected to storage controller 448, which may be connected to four ports 442a, 442b, 442c, 442d, in turn connected to four solid state drives 443a, 443b, 443c, 443d. Thus, the four solid state drives may be connected to the computing device (not shown) via the SAS connectivity and, ultimately, via the Thunderbolt™ connectivity of the core module (not shown).

FIGS. 6A-6F illustrates an example of a RAID storage module apparatus 450 in an embodiment of the present invention, specifically showing how a RAID storage module, as shown and described above with reference to FIGS. 5A-5B, may be implemented. Specifically, the RAID storage module apparatus 450 may have two levels 452, 454 housing a plurality of solid state drives 456a, 456b, 456c, 456d, with two solid state modules on each level. A storage controller 458 may be provided for controlling the solid state storage drives 456a-456d. As illustrated, the solid state drives 456a-456d may be connected via micro SATA connections to the storage controller 458, which may then, in turn, be connected to the multi-link, multi-function connector 464.

Importantly, the RAID storage module 450, as described herein, may be sized in accordance with the size dimensions of a traditional hard disk drive, namely a 3.5 inch hard disk drive. Therefore, the RAID storage module 450 may be housed within space normally reserved for hard disk drives, such as in a RAID array system or the like. FIGS. 6B-6F illustrate the general shape and dimensions of the module 450, illustrating how it may be shaped similarly or identically to a traditional 3.5 inch hard drive.

Figure 7A:
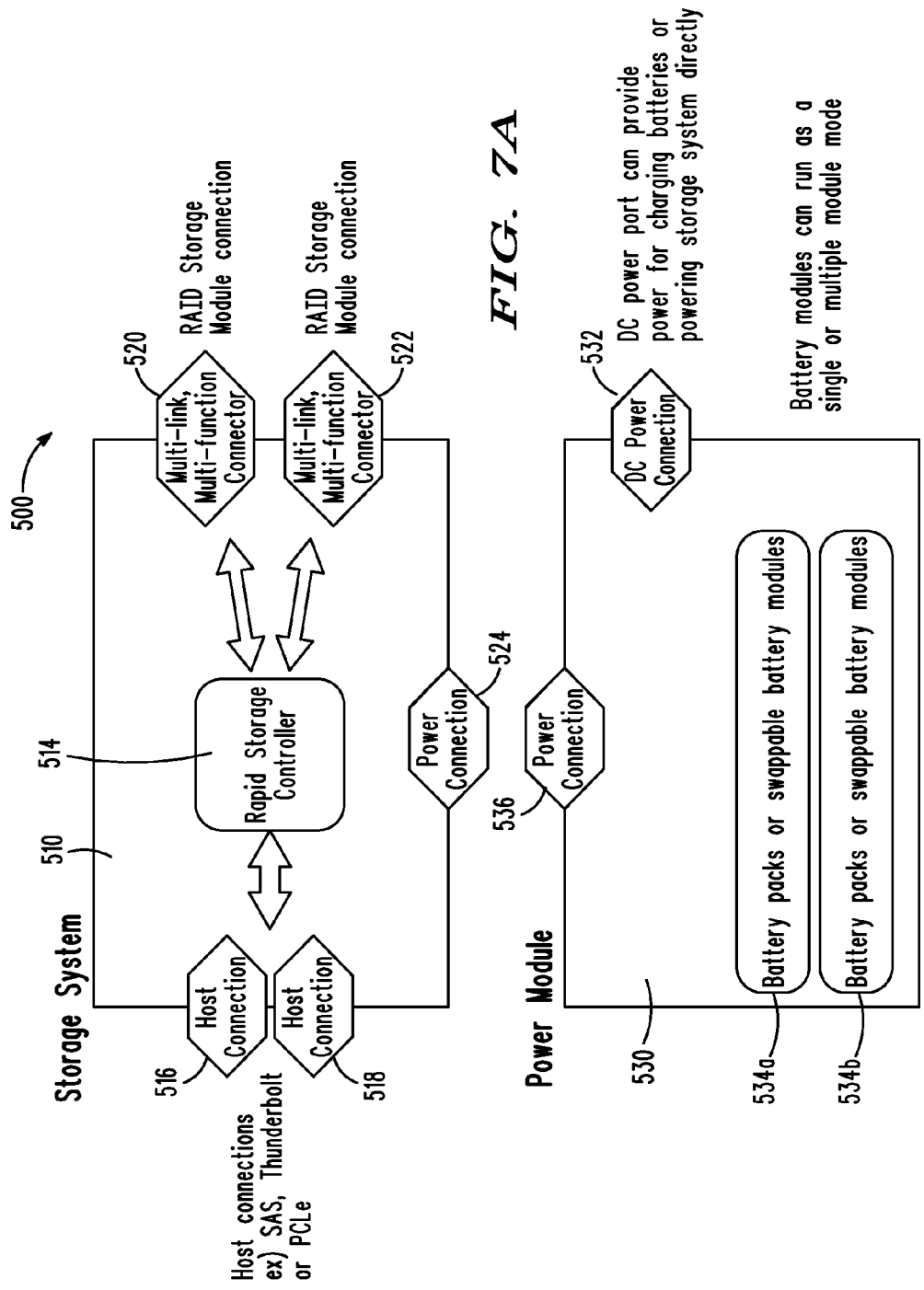
FIG. 7A-7B illustrates a RAID storage system in a still further alternate embodiment of the present invention.
Figure 7B:
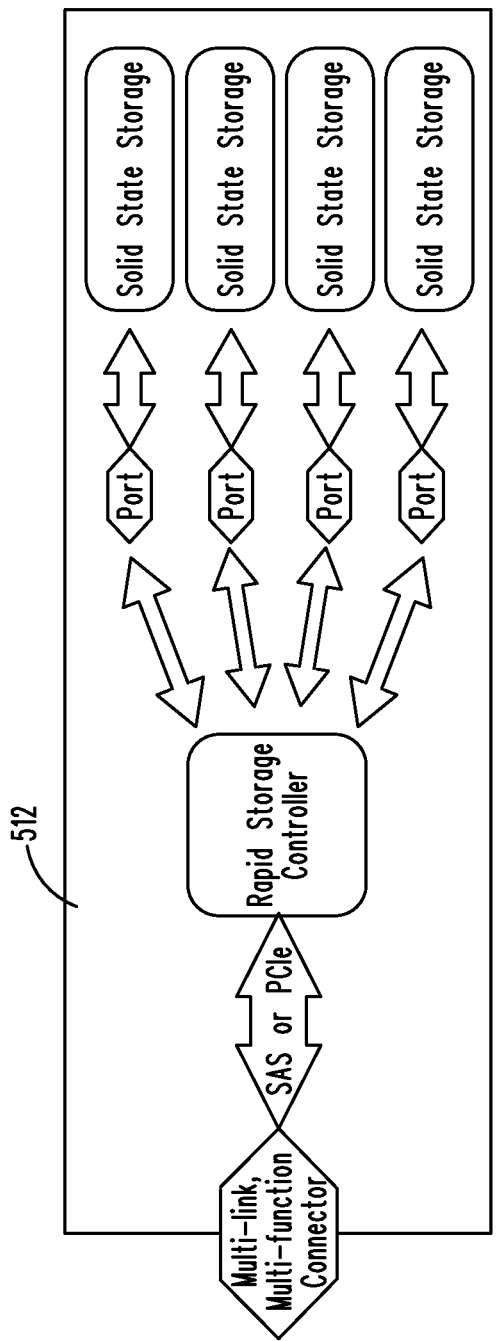

In an alternate embodiment of the present invention, a RAID storage system 500 is illustrated in FIGS. 7A-7B. The RAID storage system may house one or more of the RAID storage modules 450, as described above with reference to FIGS. 6A-6F in a single storage system that allows for storage and retrieval of large amounts of data over several solid state storage modules. The RAID storage system comprises a core module 510 that may control and interconnect a plurality of RAID storage modules 512, that may be substantially similar if not identical to RAID storage modules 430, 440, described above with reference to FIGS. 5A, 5B. The core module 510 may comprise a RAID storage controller 514 for controlling the plurality of RAID storage modules 512. The RAID storage controller 514 may be connected through one or a plurality of high speed connectors 516, 518, which may be Thunderbolt™, SAS, PCI Express, or another high speed connector. The RAID storage controller 514 may further interconnect with a plurality of multi-link, multi-function connectors 520, 522, each of which may be connected to a RAID storage module 512. Although FIGS. 7A-7B illustrates only two multi-link, multi-function connectors 520, 522, any number of multi-link, multi-function connectors may be provided for attaching to any number of RAID storage modules 512.

A power module 530 may further be provided for powering the RAID storage system 500. The power module may include a DC connector 532 for drawing external power and/or may contain one or a plurality of battery packs or swappable battery modules 534a, 534b. The DC connector 532 may be utilized for charging the battery packs 534a, 534b and/or for powering the RAID storage system 500. The power module 530 may be interconnected to the core module 510 via the power connection 536, which may interconnect with the power connection 524 on the core module.

The RAID storage system 500 may be used for applications requiring a large amount of data storage capacity. For example, the storage of video for editing or showing the same via projection, such as at a movie theater or the like, requires a large capacity storage platform. The RAID storage system 500 may be particularly useful for storage of video for showing and/or editing the same. Of course, the RAID storage system 500 may be utilized for other large capacity storage applications and the present invention should not be limited as described herein.

It should be noted that the RAID storage systems of the present invention may further contain other storage devices, and should not be limited as described herein. For example, the RAID storage systems of the present invention may include standard hard disk drives and/or other standard solid state drives that may be connected to the core module for use thereof.

FIGS. 8A-8C illustrate various views of a RAID video storage system apparatus 550 in accordance with an exemplary embodiment of the present invention. The apparatus 550, as illustrated in FIG. 8A, may include a case for storing the components of the RAID storage system 500, including spaces 552a, 552b for placing RAID storage modules 450 therein. Although FIG. 8A illustrates only two spaces 552a, 552b, it should be noted that the RAID storage system apparatus 550 may include further spaces for additional RAID storage modules to be connected thereto. FIG. 8B illustrates a rear view of the apparatus 550, including spaces 554a, 554b, 554c, 554d for holding battery packs therein. In addition, a DC connector 556 may be provided for plugging in a DC cord for powering and/or charging the same. FIG. 8C illustrates a side view thereof, including a power module 558 disposed on a bottom of the apparatus 550.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A multi-use adapter module comprising:
a core module having at least one thunderbolt connector on a first end and a first multi-link, multi-function connector on a second end thereof; and
a first port adapter module comprising a second multi-link, multi-function connector on a first end thereof and a first plurality of ports on a second end thereof for connecting a first plurality of peripheral devices thereto, and a first controller disposed between the second multi-link, multi-function connector and the first plurality of ports, wherein the first controller is uniquely adapted for the first plurality of ports and the first plurality of peripheral devices; and
a second port adapter module comprising a third multi-link, multi-function connector on a first end thereof and a second plurality of ports on a second end thereof for connecting a second plurality of peripheral devices thereto, wherein the second plurality of ports and the second plurality of peripheral devices are distinct from the first plurality of ports and the first plurality of peripheral devices, and a second controller disposed between the second multi-link, multi-function connector and the plurality of ports, wherein the second controller is uniquely adapted for the second plurality of ports and the second plurality of peripheral devices;
wherein the first multi-link, multi-function connector on the second end of the core module is connected to the second multi-link, multi-function connector on the first end of the first port adapter module in a first configuration, and further wherein the first multi-link, multi-function connector on the second end of the core module is connected to the third multi-link, multi-function connector on the first end of the second port adapter module in a second configuration.

2. The multi-use adapter module of claim 1 wherein the core module further comprises a controller disposed between the at least one thunderbolt connector and the first multi-link, multi-function connector.

3. The multi-use adapter module of claim 1 wherein the plurality of ports on the second end of the first port adapter module are selected from the group consisting of SATA, eSATA, SAS, mini-SAS, Thunderbolt, and PCI Express.

4. The multi-use adapter module of claim 1 wherein the multi-use adapter module is internally connected to a computing device.

5. The multi-use adapter module of claim 1 wherein the multi-use adapter module is externally connected to a computing device.

6. The multi-use adapter module of claim 1 further comprising a switch disposed within the first port adapter module.

7. A RAID storage module system comprising:
a first plurality of peripheral devices;
a second plurality of peripheral devices;
a multi-use adapter module comprising a core module, the core module having at least one thunderbolt connector on a first end and a first multi-link, multi-function connector on a second end thereof, a first port adapter module comprising a second multi-link, multi-function connector on a first end thereof and a first plurality of ports on a second end thereof for connecting the first plurality of peripheral devices thereto, a second port adapter module comprising a third multi-link, multi-function connector on a first end thereof and a second plurality of ports on a second end thereof for connecting the second plurality of peripheral devices thereto, wherein the first multi-link, multi-function connector on the second end of the core module is connected to the second multi-link, multi-function connector on the first end of the first port adapter module in a first configuration, and further wherein the first multi-link, multi-function connector on the second end of the core module is connected to the third multi-link, multi-function connector on the first end of the second port adapter module in a second configuration; and
a controller disposed within the multi-use adapter module.

8. The multi-use adapter module for claim 7 wherein the first plurality of peripheral devices are selected from the group consisting of a card-reader, a hard drive, a solid state drive, a fan, and a battery module.

9. The RAID storage module of claim 7 wherein the RAID storage module is contained within a traditional 3.5 inch hard drive case.

10. The RAID storage module of claim 7 wherein the RAID storage module is internally connected to a computing device.

11. The RAID storage module of claim 7 wherein the RAID storage module is externally connected to a computing device.

12. The RAID storage module of claim 7 wherein the first plurality of ports on the second end of the first port adapter module has connectivity selected from the group consisting of SATA, eSATA, SAS, mini-SAS, Thunderbolt, and PCI Express.

13. The RAID storage module of claim 7 further comprising a switch disposed within the first port adapter module.

14. The RAID storage module of claim 7 wherein the controller is disposed between the at least one thunderbolt connector and the first multi-link, multi-function connector of the core module, and further wherein the controller is generally adapted for the first plurality of ports, the second plurality of ports, the first plurality of peripheral devices, and the second plurality of peripheral devices.

15. The RAID storage module of claim 7 wherein the controller is disposed between the second multi-link, multi-function connector and the first plurality of ports of the first port adapter module, and further wherein the controller is uniquely adapted for the first plurality of ports and the first plurality of peripheral devices.

16. A RAID storage system comprising:
a RAID enclosure comprising at least one host connector connected to a RAID controller, a power input, and a plurality of RAID storage module connectors connected to the RAID controller;
a first RAID storage module comprising a first multi-link, multi-function connector on a first end thereof, a first storage controller connected to the first multi-link, multi-function connector and a first plurality of ports, wherein the first plurality of ports are connected to a first plurality of solid state storage drives, and further wherein the first storage controller is configured to control data transfer between the first plurality of ports and the first plurality of solid state storage drives; and
a second RAID storage module comprising a second multi-link, multi-function connector on a first end thereof, a second storage controller connected to the second multi-link, multi-function connector and a second plurality of ports, wherein the second plurality of ports are connected to a second plurality of solid state storage drives, and further wherein the second storage controller is configured to control data transfer between the second plurality of ports and the second plurality of solid state storage drives;
wherein the first RAID storage module and the second RAID storage module are connected to the RAID enclosure through the plurality of RAID storage module connectors, and further wherein the RAID controller regulates data transfer from the first RAID storage module and the second RAID storage module to the at least one host connector.

17. The RAID storage system of claim 16 wherein the plurality of RAID storage module connectors are selected from the group consisting of SATA, eSATA, SAS, mini-SAS, Thunderbolt, and PCI Express.

18. The RAID storage system of claim 16 wherein the RAID enclosure is externally connected to a computing device.

19. The RAID storage system of claim 16 wherein the RAID enclosure is internally connected to a computing device.

* * * * *